United States Patent [19]
Gehman

[11] Patent Number: 6,115,770
[45] Date of Patent: Sep. 5, 2000

[54] SYSTEM AND METHOD FOR COORDINATING COMPETING REGISTER ACCESSES BY MULTIPLE BUSES

[75] Inventor: Judy M. Gehman, Fort Collins, Colo.

[73] Assignee: LSI Logic Corporation, Milpitas, Calif.

[21] Appl. No.: 09/047,772

[22] Filed: Mar. 25, 1998

[51] Int. Cl.[7] .......................... G06E 13/38; G06E 13/40
[52] U.S. Cl. .............................. 710/128; 40/126; 40/129
[58] Field of Search .................................. 710/128, 126, 710/129, 130, 107, 240, 36, 40; 711/150, 151, 152

[56] References Cited

U.S. PATENT DOCUMENTS

| | | | |
|---|---|---|---|
| 4,148,011 | 4/1979 | McLagan et al. | 340/147 |
| 4,897,786 | 1/1990 | Pimm et al. | 364/200 |
| 4,937,733 | 6/1990 | Gillett, Jr. et al. | 364/200 |
| 5,088,028 | 2/1992 | Theus et al. | 395/325 |
| 5,167,022 | 11/1992 | Bahr et al. | 395/325 |
| 5,175,828 | 12/1992 | Stumpf et al. | 395/375 |
| 5,404,464 | 4/1995 | Bennett | 710/101 |
| 5,426,740 | 6/1995 | Bennett | 710/126 |
| 5,454,082 | 9/1995 | Walrath et al. | 395/288 |
| 5,548,780 | 8/1996 | Krein | 395/825 |
| 5,598,538 | 1/1997 | Cooper | 395/281 |
| 5,664,092 | 9/1997 | Waites | 395/183.01 |
| 5,678,064 | 10/1997 | Kulik et al. | 710/28 |
| 5,828,856 | 10/1998 | Bowes et al. | 710/129 |

OTHER PUBLICATIONS

Symbios Logic; SYM13FW600 Data Sheet; PCI to IEEE–1394 Host Bus Interface;1997;pp. 1–7.
Symbios Logic, SYM13FW600 Specification, Client/Server; revision 0.92B, Mar. 4, 1998; pp. 1–133.
1394 Open Host controller Interface Specification, Release 1.00; Oct. 20, 1997; pp. 1–170.

*Primary Examiner*—Ario Etienne

[57] ABSTRACT

An electronic circuit coordinates accesses to a register shared among multiple system resources by managing the priority of each system resource relative to others. When a priority register access is initiated, a signal is generated to block a simultaneous or overlapping register access by another system resource. If another register access is already in operation, it will be completed before the priority register access operates on the shared register. Otherwise, if the priority register access operates on the register first, the non-priority register access is held off until the priority register access completes. A method coordinates the potentially simultaneous or overlapping register accesses by multiple system resources to a shared register. When a priority register access initiates, a lookahead signal issues to set a busy flag that blocks competing register accesses until the priority register access completes.

34 Claims, 4 Drawing Sheets

SYSTEM AND METHOD FOR COORDINATING COMPETING REGISTER ACCESSES BY MULTIPLE BUSES

BACKGROUND OF THE INVENTION

1. Field of the Invention

The present invention pertains generally to computer systems and more particularly to systems and methods of controlling register access in an electronic circuit.

2. Background of the Invention

A computer system typically includes a host data bus that conveys data among resources within the system. For example, it is popular for modern personal computer systems to have a host bus that complies with the Peripheral Component Interconnect (PCI) specification. The PCI host bus may support a variety of peripherals, including graphics cards, SCSI adapters and sound adapters.

In some applications, a host PCI bus may also support a host controller interface (HCI) to a second bus, such as a bus complying with the IEEE 1394-1995 Standard for a High-performance Serial Bus, Aug. 30, 1996 (the "1394 Standard"), incorporated herein by reference. In the case of an HCI supporting an IEEE 1394 bus, it is preferable that the controller comply with the 1394 Open Host Controller Interface Specification, Release 1.0, Oct. 20, 1997, herein incorporated by reference, which defines requirements of a standard 1394 Open HCI. For example, a 1394 bus may connect peripherals to a host computer system.

The 1394 Standard defines the standard characteristics of a 1394 bus and devices attached thereto. For example, a 1394-compliant device on a 1394-compliant bus must communicate with an HCI following a specific protocol, defined in the 1394 Standard. One aspect of this communication protocol is a set of lock transactions, including, for example: mask_swap, compare_swap, fetch_add, little_add, bounded_add, and wrap_add. Generally, a lock transaction is a transaction accessing a resource that requires more than one clock cycle to complete and prevents access to the same resource by another transaction until it completes.

According to the 1394 Standard, the compare_swap function (the "compare-and-swap" function) is required to access a sequence of bus management registers: the BUS_MANAGEMENT_ID register, the BANDWIDTH_AVAILABLE register, the CHANNELS_AVAILABLE_HI register, and the CHANNELS_AVAILABLE_LO register. The 1394 standard specifies that lock transactions may be implemented in hardware or software. A hardware implementation of a compare-and-swap function requires more than one clock cycle to execute completely.

Figure 1:
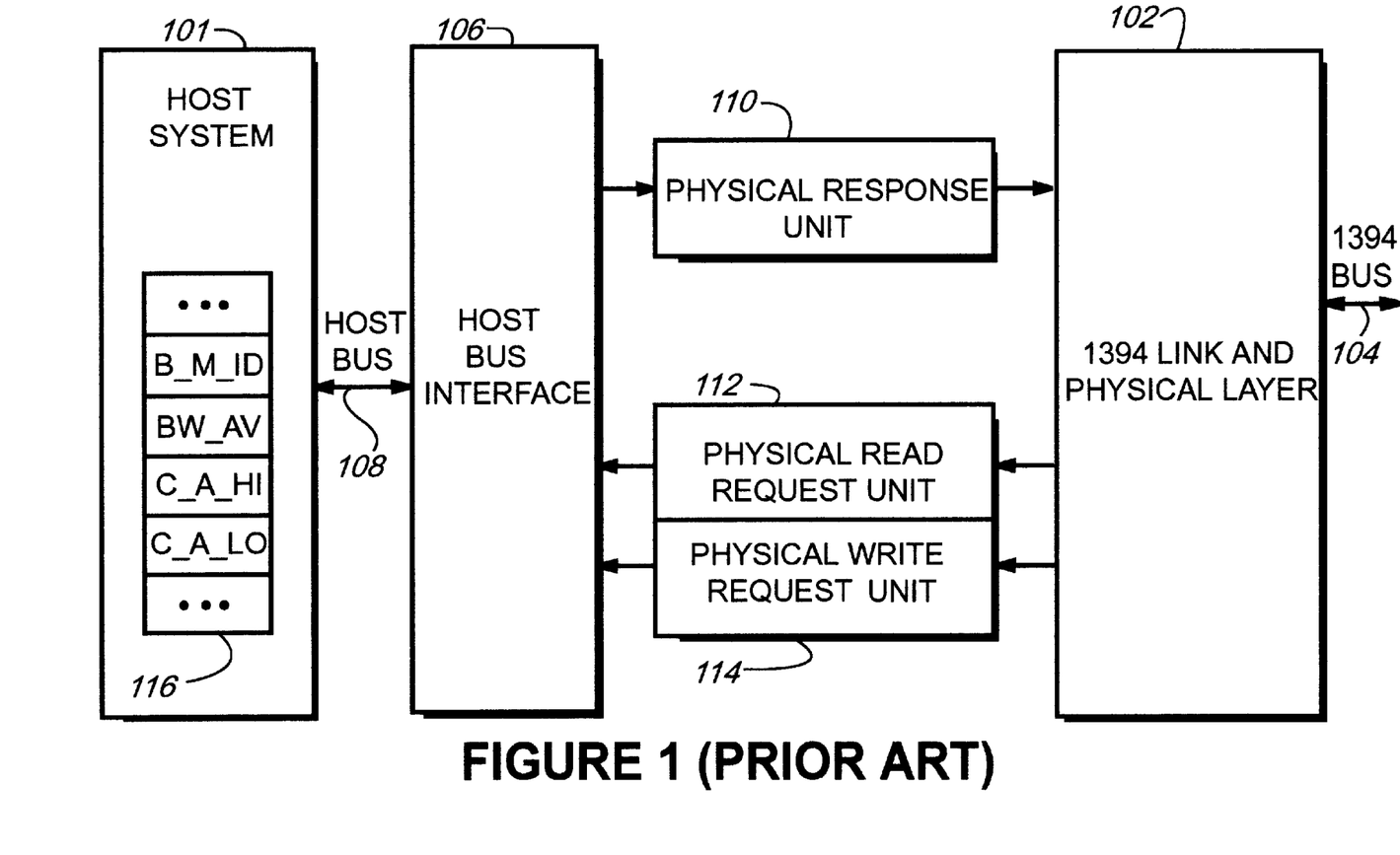
FIG. 1 depicts a block diagram of a prior art host controller lacking 1394 Open HCI specification compliance.

FIG. 1 depicts a prior implementation of a 1394 host controller 100 that does not comply with the 1394 Open HCI specification, which requires a hardware implementation of the lock transaction circuitry. Bus management registers 116 are implemented in the host memory of host system 101. The 1394 link and physical layer 102 is connected to 1394 bus 104, and host bus interface 106 is connected to host bus 108. The 1394 link and physical layer 102 communicates with host bus interface 106 via the physical response unit 110, physical read request unit 112, and physical write request unit 114 to access registers in a physical address range. Write lock requests, such as compare-and-swap operations, to bus management registers 116 from nodes located on the 1394 bus 104 are received by the 1394 link and physical layer 102 in the form of packet data and sent to host-resident software for execution. The host software coordinates overlapping compare-and-swap operations from competing buses by scheduling such requests sequentially on a first come, first served basis. In other words, the software acts as a gateway to guarantee the sequential, non-overlapping execution of overlapping compare-and-swap requests.

The 1394 Open HCI specification defines characteristics of a standard 1394 host controller. Among other requirements, the 1394 Open HCI requires a hardware implementation for performing lock transactions from one or more buses, including specified data, argument and control registers associated with each supported bus. In a configuration with more than one bus, nodes from multiple buses may attempt to access a shared target register simultaneously. In other words, each bus can independently initiate a lock transaction using its respective data, compare, and control register set. Because a compare-and-swap function requires more than one clock cycle to complete, there is substantial opportunity for one bus to start a compare-and-swap operation while the other bus is performing this same operation on the same register (i.e., overlapping execution of compare-and-swap operations). If allowed, such an occurrence may cause the data in the target register to become corrupted. This possibility of corrupted data exists for any host controller interface that supports potentially simultaneous lock transactions from two or more buses to the same target register. In 1394 Open HCI systems with multiple 1394 buses, each 1394 bus is associated with its own hardware implementation of bus management registers and lock transaction circuitry.

The 1394 Open HCI specification does not, however, define the actual hardware implementation of the circuitry for such lock transactions. That is, the 1394 Open HCI specifies that a compliant HCI satisfy certain functional requirements, but the electrical circuit that implements those functional requirements is undefined. Therefore, need exists for a circuit and method to coordinate competing lock transactions directed to the same target register so as to prevent a collision that could cause data corruption.

SUMMARY OF THE INVENTION

It is therefore an object of the present invention to provide a device for coordinating potentially simultaneous or overlapping accesses to a data storage location shared by multiple system resources or buses.

It is another object of the present invention to provide a device to prevent data corruption in a register or memory location caused by simultaneous or overlapping accesses by more than one system resource.

It is yet another object of the present invention to provide a device to grant priority to an access to a data storage location by a first bus so as to prevent data corruption caused by an access from a second bus sharing the same data storage location.

It is yet another object of the present invention to provide a technique for coordinating potentially simultaneous or overlapping accesses to a data storage location shared by multiple system resources.

It is yet another object of the present invention to provide a technique for preventing data corruption by simultaneous or overlapping accesses to a data storage location by more than one system resource.

Additional objects, advantages, and novel features of the invention will be set forth in part in the description which follows and in part will become apparent to those skilled in the art upon examination of the following or may be learned by practice of the invention. The objects and advantages of the invention may be realized and attained by means of the instrumentalities and combination particularly pointed out in the appended claims.

To achieve the foregoing and other objects, and in accordance with the purposes of the present invention, as embodied and broadly described herein, the circuit of this invention may comprise a target data storage location coupled between a priority bus and a secondary bus; a priority access interface coupled to a target data storage location and the priority bus that controls a priority access to the target data storage location from the priority bus; a secondary access interface coupled to the target data storage location and the secondary bus that controls a secondary access to the target data storage location from the secondary bus; and a priority control module coupled to the priority access interface that causes the secondary access from the secondary bus to be blocked during and in response to a request for the priority access from the priority bus.

The present invention may also comprise, in accordance with its object and purposes, a method having the steps of receiving a request for a priority access to a target data storage location from a priority bus; providing a lookahead signal in response to the request for the priority access; setting a busy signal in response to the lookahead signal; performing a first phase of the priority access; performing a second phase of the priority access; and resetting the busy signal during the second phase of the priority access.

DETAILED DESCRIPTION OF THE INVENTION

The 1394 Open Host Controller Interface ("Open HCI") is an implementation of the link layer protocol of a 1394 serial bus, with additional features to support the transaction and bus management layers. Among many other features and requirements, a 1394 Open HCI implements a number of autonomous Control and Status Register (CSR) resources, including the 1394 compare-and-swap bus management registers. The CSR resources comply with the "ISO/IEC 13213: 1994 [ANSI/IEEE Std 1212, 1994 Edition], Information technology—Microprocessor systems—Control and Status Registers (CSR) Architecture for microcomputer buses," herein incorporated by reference. The bus management registers are implemented in hardware internal to the 1394 Open HCI and consist of the following registers: BUS_MANAGEMENT_ID register, the BANDWIDTH_AVAILABLE register, the CHANNELS_AVAILABLE_HI register, and the CHANNELS_AVAILABLE_LO register. Although the detailed description of a preferred embodiment focuses on write accesses to data registers, the invention generally contemplates coordinating any lock transaction to a shared storage location, including a data register or a memory location. Specified lock transactions include, for example: mask_swap, compare_swap, fetch_add, little_add, bounded_add, and wrap_add.

Figure 2:
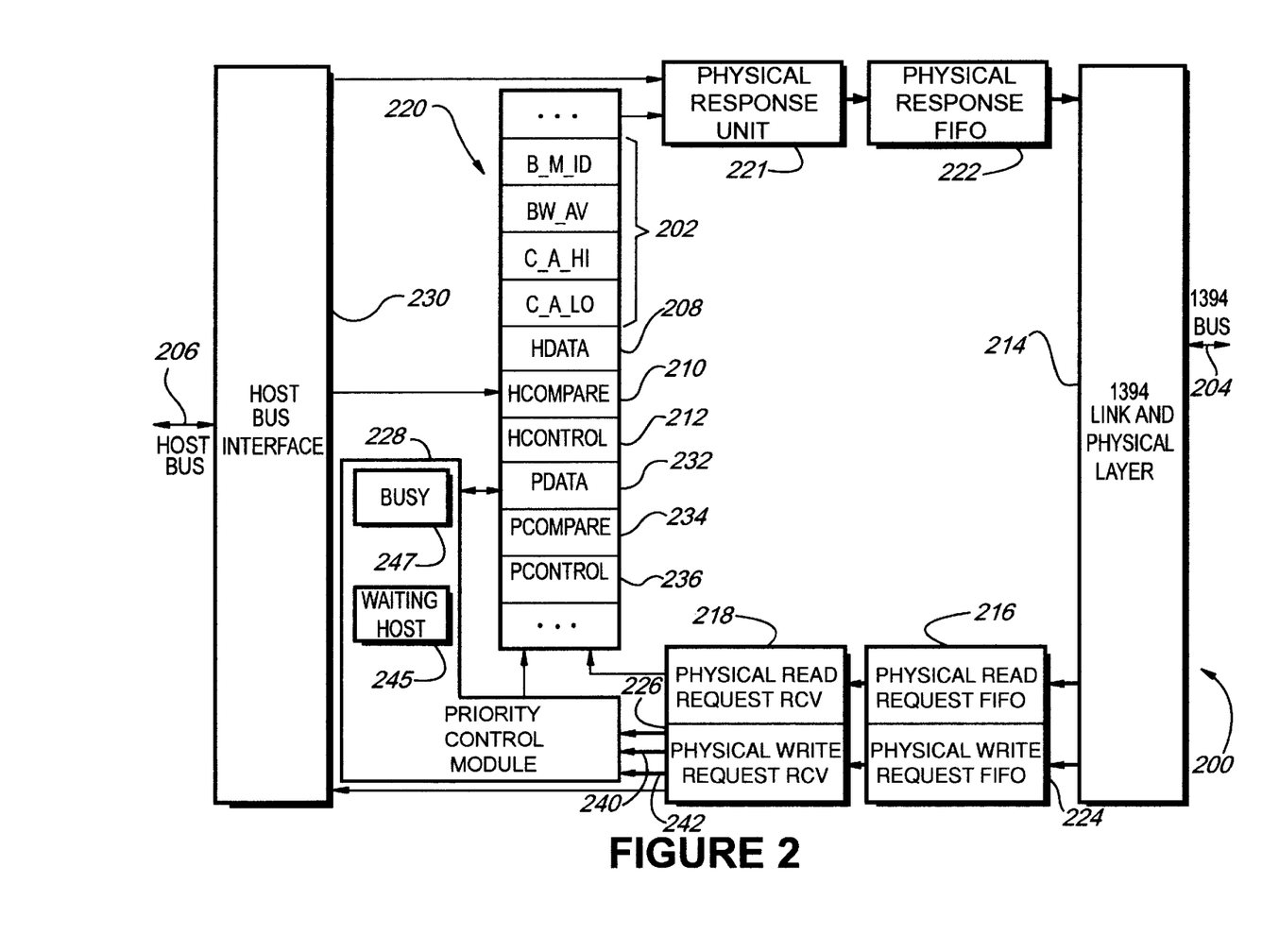
FIG. 2 depicts a block diagram of a preferred embodiment in accordance with the present invention.

FIG. 2 depicts a preferred embodiment of a 1394 Open HCI device 200, in accordance with the present invention. In this implementation, 1394 bus 204 has priority over the host bus, but the priority assignment may vary and may be allocated among more than two buses. For the purposes of FIG. 2, the host bus 206 is a secondary bus in that it has a lower priority than 1394 bus 204. Bus management registers 202 are physically located in the 1394 Open HCI device 200, not in the host system as shown in the prior art of FIG. 1. Bus management registers 202 and other internal 1394 Open HCI registers (shown generally at 220), including the host CSR registers 208, 210, and 212, are mapped to a portion of the host system's address space (not shown). CSR registers for the 1394 registers (232, 234, and 236) are not mapped into the host system's address space but are coupled to the physical write request module 226. Physical read request module 218 is coupled to bus management registers 202 and is not required to access bus management registers 202 through the CSR registers. The host system generally writes to bus management registers 202 using host address lines to access the host CSR registers 208, 210, and 212, but the 1394 bus writes to bus management registers 202 using 1394 CSR registers 232, 234, and 236, which are not accessible by the host system using host address lines. Both host CSR registers and 1394 CSR registers support the compare-and-swap function for the corresponding bus. The 1394 bus accesses the 1394 CSR registers through physical write request module 226 using physical addresses. If the 1394 bus writes to the physical address of a bus management register in a compare-and-swap transaction, the physical write request module 226 will execute a compare-and-swap operation to the target register, where the target register is the bus management register to which the compare-and-swap operation is directed.

The compare-and-swap function requires a data parameter (data_value), an argument parameter (arg_value), and a target register selection code (reg_select) as inputs and returns a resulting value (old_value) as output, which was the previous value in the target register. These values are communicated between a bus and the bus management registers 202 via a trio of CSR registers: a CSR data register, a CSR compare register, and a CSR control register. Each bus having access to bus management registers 202 has at least a trio of such CSR registers. For the purposes of this disclosure, hdata register 208, hcompare register 210, and hcontrol register 212 in FIG. 2 are the CSR registers providing host access to bus management registers 202. Likewise, pdata register 232, pcompare register 234, and pcontrol register 236 provide 1394 bus access to bus management registers 202.

The compare-and-swap function is prepared by loading a data_value and an arg_value into corresponding CSR data registers (e.g., hdata and pdata) and compare registers (e.g., hcompare and pcompare) and is executed when the reg_select value is written to the CSR control register (e.g., hcontrol and pcontrol). The reg_select value specifies the bus management registers 202 on which the compare-and-swap function is to operate. Thereafter, the HCI compares the old_value, which is currently stored in the target register, to the arg_value. If the old_value equals the arg_value, the data_value is written to the target register and the old_value is returned to the appropriate CSR data register (hdata and pdata). If the old_value does not equal arg_value, the old_value remains in the target register and is also returned in the CSR data register. A compare-and-swap operation requires two clock cycles to complete after a control register (e.g., hcontrol and pcontrol) is written. A "compare" phase occurs during the first clock cycle, and a "swap" phase occurs during the second clock cycle. The compare-and-swap function returns a status (csrDone) to the CSR control register to indicate completion of the operation. The operation was successful (i.e., data_value was written to the target register) if the result in the appropriate CSR data register (e.g., hdata or pdata) equals arg_value.

A compare-and-swap operation provides atomic access to one of bus management registers 202 from either the host bus 206 or from 1394 bus 204. To access one of the bus management registers 202 from the host bus 206, the host system must first load an hdata register 208 with the new data value to be loaded into the appropriate bus management register (the "target" register). The host must also load hcompare register 210 with the value expected to be currently in the target register. Generally, the procedure for writing to CSR registers allows the data register (e.g., hdata register 208) and the compare register (e.g., hcompare register 210) to be written in any order so long as the writes to these registers occur prior to the write to the control register (e.g., hcontrol register 212). This is true for both host and 1394 CSR registers. Thereafter, the host must write the hcontrol register 212 with the reg_select value of the target register. A write to hcontrol register 212 initiates a compare-and-swap operation on the target register. When the compare-and-swap operation is complete, a csrDone bit (not shown) in hcontrol register 212 is set, and the hdata register 208 contains the previous value of the target register. If this previous value equals the value loaded in hcompare, the operation was successful.

To access one of the bus management registers 202 from 1394 bus 204, a node (not shown) attached to 1394 bus 204 sends a packet to 1394 link and physical layer 214. A packet indicates the destination node, the source node, the type of requests, the destination address, and other information, as specified in the 1394 standard. A read request packet also includes a transaction label, a "tcode" identifying the type of packet, a retry code, a priority field, and a CRC header. A write lock request packet includes the information described in a read request packet and, in addition, includes a data_ value, an arg_value, the length of the data to be written, and a CRC value for the write data. For both operations, the reg_select address to be written to the control register is represented by an offset in the destination address field.

If the packet specifies a read request to a bus management register 202, the request is directed into physical read request FIFO 216. Read requests are processed sequentially in a first-in, first-out manner by physical read request receive module 218. Read requests access the bus management register 202 without using the CSR registers. The result of the read request is selected from the appropriate bus management register 202, and directed into physical response FIFO 222 by physical response unit 221. From physical response FIFO 222, the result is packetized in 1394 link and physical layer 214 for transmission via 1394 bus 204 to the requesting 1394 node (not shown).

If the packet specifies a write lock request, the request packet is directed into physical write request FIFO 224. Write lock request packets are processed sequentially in a first-in, first-out manner by physical write request receive module 226. If the address is a write lock request operation to one of the bus management registers 202, then the request is processed through the priority control module 228. Otherwise, the request is processed through host bus interface 230. It should be noted that in a preferred embodiment in accordance with the present invention, the physical read request FIFO 216 and the physical write request FIFO 224 are combined into a single physical FIFO device.

When physical write request receive module 226 receives a write lock request from the 1394 bus 204, it issues phylookahead signal on line 240 in preparation of blocking accesses by the host bus to bus management registers 202. The phylookahead signal on line 240 is pulsed high for one clock, cycle two cycles before the physical write request receive module 226 writes the reg_select value to pcontrol register 236. The two cycles are the eval_update_time for the compare-and-swap operation. The eval_update_time value represents the time required to complete the lock transaction. For a compare-and-swap transaction, this value is two clock cycles. In a different lock transaction, this value could be greater. Registers pdata 232 and pcompare 234 may be written at any time before physical write request receive module 226 writes to pcontrol 236.

The phylookahead signal on line 240 (corresponding to phylookahead pulse 404 in FIG. 4) sets a busy signal on line 247 to block lock transactions from the host bus. For example, if the host writes into its hcontrol register 212 at the same time physical write request receive module 226 writes to pcontrol register 236, the busy signal on line 247 is already set (having been set in response to phylookahead signal on line 240 two clock cycles previously) and the host's lock transaction is held off until the busy signal on line 247 resets. The busy signal on line 247 resets during the "swap" phase of the 1394 compare-and-swap operation so that a pending host compare-and-swap operation may commence in the clock cycle following the "swap" phase of the 1394 compare-and-swap operation.

While the host's lock transaction is waiting, a waitinghost signal on line 245 is set. Once the "swap" phase of the 1394 compare-and-swap operation is complete, the busy signal on line 247 resets and the "compare" phase of the pending host compare-and-swap operation may commence. During the host's "compare" phase, the waitinghost signal on line 245 resets. By comparison, if the host has already started its two-clock-cycle compare-and-swap request when the physical write request receive module 226 receives the write lock request from 1394 bus 204, the host operation will have necessarily completed before the physical write request receive module 226 writes to its pcontrol register 236, thereby avoiding a collision of potentially competing compare-and-swap requests.

If physical write request receive module 226 aborts the 1394 write lock operation, it issues a phyabort signal on line 242, which is a high pulse lasting one clock cycle. The phyabort signal on line 242 clears the busy signal on line 247 in the same clock cycle the phyabort signal is pulsed.

More than one register or set of registers may be supported using the apparatus and method in accordance with the present invention. In the embodiment described herein, four bus management registers are supported by the same set of data, compare, and control registers, but multiple data, compare, and control registers may be used to support multiple target registers in any combination. The reg_select code, which is written to the appropriate control register (hcontrol or pcontrol) indicates the register on which the compare-and-swap operation is performed. Likewise, other sets of registers may be supported by a single set of data, compare, and control registers, or by multiple sets of data, compare, and control registers.

Figure 3:
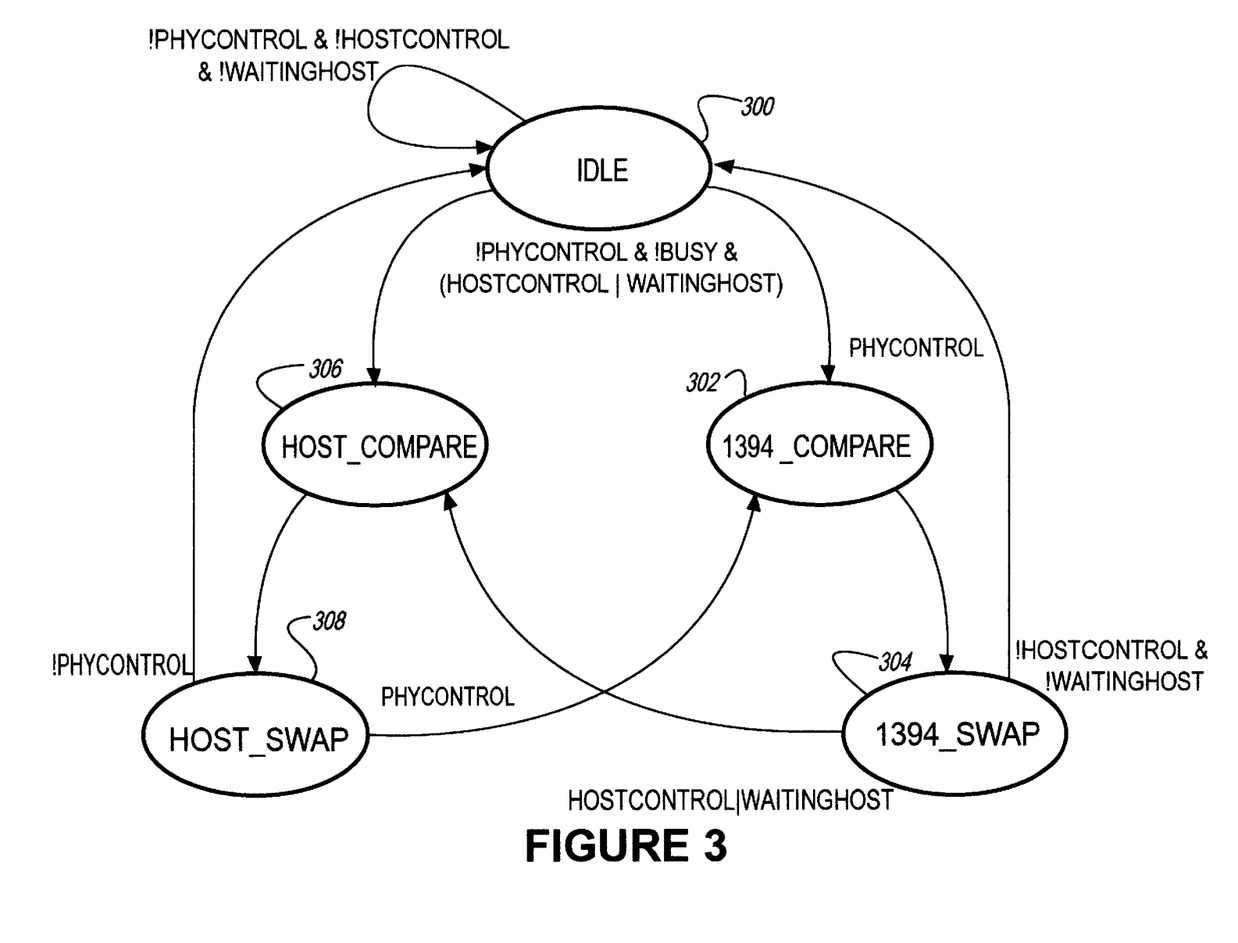
FIG. 3 depicts a state machine diagram of a preferred embodiment in accordance with the present invention.

FIG. 3 depicts a state machine representing the operation of an embodiment of the present invention. The notation in FIG. 3 includes signal names, state names, and Boolean operators. The '|' character represents a Boolean "OR" operation, and the '&' character represents a Boolean "AND" operation. The '!' character represents a Boolean "NOT" operation. The open and closed parentheses ('(' and ')') denote a priority operation, such that operations within a pair of parentheses are performed prior to operations outside of the pair of parentheses.

IDLE state 300 represents a state wherein neither a host bus nor a 1394 bus is executing or waiting to execute a compare-and-swap operation. This state machine is controlled by four signals: PhyControl, HostControl, Busy, and WaitingHost. The PhyControl signal indicates a write to a 1394 control register (pcontrol 236 in FIG. 2). The Host-Control signal indicates a write to a HostControl register (hcontrol 212 in FIG. 2). These control signals represent attempts by the host bus or 1394 bus to initiate a compare-and-swap operation. The busy signal is set in response to a PhyLookAhead pulse, and represents a pending or concurrent compare-and-swap operation by the 1394 bus. The busy signal remains set following a PhyLookAhead pulse until the state machine reaches the 1394_Swap state 302. The WaitingHost signal indicates that the host bus has attempted to initiate a compare-and-swap operation in the same cycle as the 1394 bus or during a period when the busy signal is set.

When the device is in IDLE state 300, no pending nor concurrent compare-and-swap operation exists. In response to a PhyControl signal from the 1394 bus, the state machine transitions to state 1394_Compare 302. On the next clock signal the state machine transitions to the 1394_Swap state 304. If, at the conclusion of the 1394_Swap state 304, the HostControl signal and the WaitingHost signal are not set, the state machine transitions back to IDLE state 300. Alternatively, if either the HostControl signal or the WaitingHost signal is set, the state machine transitions from 1394_Swap state 304 to Host_Compare state 306, which represents the first phase of a Host compare-and-swap operation. The 1394_Swap state 304 represents the second phase of a 1394 compare-and-swap operation.

Returning again to IDLE state 300, if either the HostControl signal or the WaitingHost signal is set, and neither the busy signal nor the PhyControl signal are set, the state machine transitions from IDLE state 300 to Host_Compare state 306. On the next clock cycle, the state machine transitions to Host_Swap state 308. If, at the completion of Host_Swap state 308, the PhyControl signal is not set, the state machine transitions back to IDLE state 300. Alternatively, if the PhyControl signal is set, the state machine transitions to 1394_Compare state 302, which represents the first phase of a 1394 compare-and-swap operation. Host_Swap state 308 represents the second phase of a host compare-and-swap operation.

Figure 4:
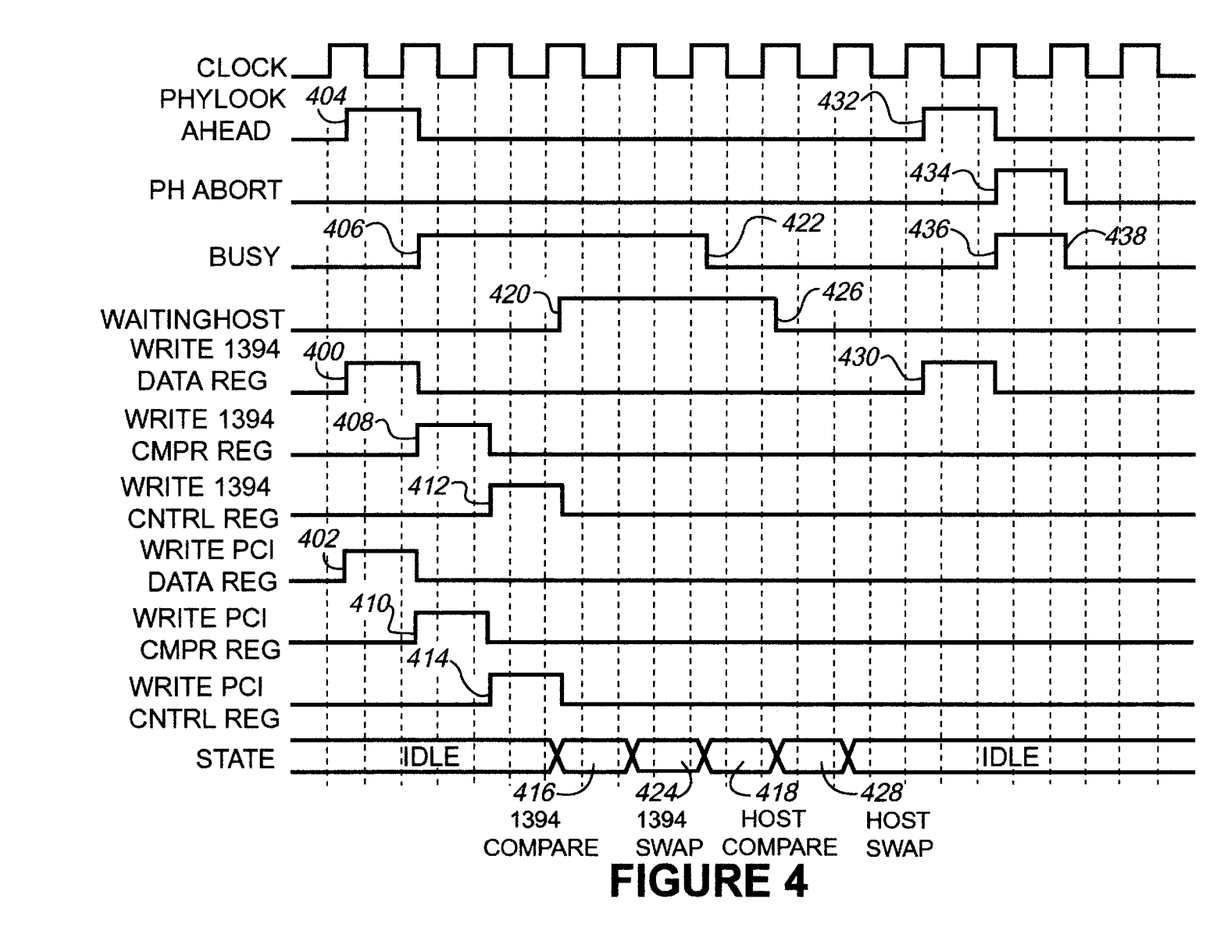
FIG. 4 depicts a timing diagram of signals and operations of a preferred embodiment in accordance with the present invention.

FIG. 4 depicts a timing diagram including various internal signals, operations, and system states of a preferred embodiment in accordance with the present invention. "CLOCK" represents an externally generated periodic clocking signal input to the device. Signals and operations in a preferred embodiment in accordance with the present invention are synchronized on the rising edge of the clock signal. "PhyLookAhead," "PhysAbort," "BUSY," and "WaitingHost" have been defined previously. "STATE" represents states of the state machine represented in FIG. 3.

A write lock transaction by the 1394 bus is initiated by a lock request packet received by the physical write request module 226 in FIG. 2. Operation Write1394DataReg represents a physical request write operation to the pdata register 232 in FIG. 2. Operation Write1394CmprReg represents a physical request write operation to the pcompare register 234 in FIG. 2. Operation Write1394CntrlReg represents a physical request write operation to the pcontrol register 236 in FIG. 2. Operation Write1394CntrlReg also corresponds to the PhyControl signal in FIG. 3. Likewise, operation WritePCIDataReg represents a host write operation to the hdata register 208 in FIG. 2. Operation WritePCICmprReg represents a host write operation to the hcompare register 210 in FIG. 2. Operation WritePCICntrlReg represents a host write operation to the hcontrol register 212 in FIG. 2. Operation WritePCICntrlReg also corresponds to the Host-Control signal in FIG. 3.

The first part of the timing diagram illustrates the condition when the host bus and the 1394 bus attempt to initiate compare-and-swap operations simultaneously, that is, on the same clock cycle. As shown, the Write1394DataReg operation and the WritePCIDataReg operation occur on the same clock cycle at 400 and 402, respectively. In response to receipt of a lock request packet, the PhyLookAhead Signal pulses high for one clock cycle at 404. In response to the PhyLookAhead Signal, the busy signal sets at 406 in the clock cycle following the leading edge of the PhyLookAhead pulse. Meanwhile, the Write1394CmprReg and WritePCICmprReg operations proceed at 408 and 410, respectively.

Thereafter, Write1394CntrlReg and WritePCICntrlReg operations commence on the same clock cycle at 412 and 414, respectively, while the busy signal remains set at 406. On the next clock cycle, the 1394_Compare State 416 occurs while the Host_Compare state 418 is held off and WaitingHost signal 420 is set. During the 1394_Swap state at 424, the busy signal resets at 422. At the completion of 1394_Swap state 424, Host_Compare state 418 commences. At the completion of Host_Compare state 418, the WaitingHost signal resets at 426 and Host_Swap state 428 occurs. At the completion of Host_Swap state 428, the system returns to the IDLE state.

The timing diagram also illustrates the effect of a PhysAbort signal on a concurrent 1394 compare-and-swap operation. A Write1394DataReg operation commences at 430, and the PhyLookAhead signal is pulsed at 432. In this scenario, the busy signal sets at 436 in the clock cycle following the PhyLookAhead pulse. In FIG. 4, the 1394 interface circuitry aborts its compare-and-swap operation by issuing the PhysAbort signal at 434. The busy signal resets at 438 in response to the PhysAbort signal, and the 1394 compare-and-swap operation then terminates.

While the method disclosed herein has been described and shown with reference to particular steps performed in a particular order (for example, in the timing diagram and state machine diagram), it will be understood that these steps may be combined, sub-divided, or re-ordered to form an equivalent method without departing from the teachings of the present invention. Accordingly, unless specifically indicated herein, the order and grouping of the steps is not a limitation of the present invention.

Moreover, while there have been described herein the principles of the present invention in conjunction with a 1394 Open HCI, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. An electronic circuit coupled between a priority bus and a secondary bus for coordinating overlapping access requests received from each bus, said electronic circuit comprising:
   a target data storage location coupled between said priority bus and said secondary bus;
   a priority access interface coupled between said target data storage location and said priority bus that controls execution of a priority access to said target data storage location from said priority bus, responsive to an access request for said priority access received from said priority bus;
   a secondary access interface coupled between said target data storage location and said secondary bus that controls execution of a secondary access to said target data storage location from said secondary bus, responsive to an access request for said secondary access received from said secondary bus; and
   a priority control module coupled to said priority access interface and to said target data storage location that causes execution of said secondary access from said secondary bus to be temporarily blocked during execution of said priority access and in response to said access request for said priority access from said priority bus, and wherein execution of said blocked secondary access is automatically unblocked after execution of said priority access independent of a subsequent request for said secondary access to said target data storage location from said secondary bus.

2. The electronic circuit of claim 1 further comprising an abort signal issued from said priority access interface to terminate execution of the priority access and to unblock execution of the secondary access.

3. The electronic circuit of claim 1 wherein said target data storage location is a register accessible by said priority bus and said secondary bus.

4. The electronic circuit of claim 1 wherein said target data storage location is accessible by said priority bus through a set of Control and Status Registers.

5. The electronic circuit of claim 1 wherein said target data storage location is accessible by said secondary bus through a set of Control and Status Registers.

6. The circuit of claim 1 wherein execution of said blocked secondary access is automatically unblocked so as to execute in a clock cycle immediately following completed execution of said priority access.

7. An electronic circuit coupled to a priority bus and a secondary bus comprising:
   a target data storage location accessible by said priority bus and said secondary bus;
   a priority access interface coupled to said target data storage location and said priority bus that causes a priority access from said priority bus and issues a lookahead signal in response to a request for said priority access from said priority bus;
   a secondary access interface coupled to said target storage location and said secondary bus;
   a busy signal having an asserted state and a deasserted state, said busy signal entering said asserted state in response to said lookahead signal, said busy signal automatically entering a deasserted state after said execution of said priority access; and
   a priority control module coupled to said priority access interface, said target data storage location, and said busy signal, said priority control module allowing a secondary access from said secondary bus if said busy signal is in said deasserted state.

8. The electronic circuit of claim 7 wherein said target data storage location comprises a register.

9. The electronic circuit of claim 7 further comprising a priority data register, a priority compare register and a priority control register coupled to said priority access interface.

10. The electronic circuit of claim 9 wherein said priority data register, said priority compare register and said priority control register are Control and Status Registers.

11. The electronic circuit of claim 10 further comprising a priority control signal written to said priority control register in said electronic circuit that initiates said priority access.

12. The electronic circuit of claim 7 further comprising an abort signal generated from said priority access interface to terminate said priority access.

13. The electronic circuit of claim 7 further comprising an abort signal that causes said busy signal to enter said deasserted state.

14. The electronic circuit of claim 7 further comprising a secondary data register, a secondary compare register and a secondary control register.

15. The electronic circuit of claim 14 wherein said secondary data register, said secondary compare register and said secondary control register are Control and Status Registers.

16. The electronic circuit of claim 15 further comprising a secondary control signal written to said secondary control register that initiates said secondary access.

17. The electronic circuit of claim 7 wherein said secondary access is blocked if said busy signal is in said asserted state.

18. The electronic circuit of claim 7 wherein said secondary access initiates when said busy signal enters said deasserted state.

19. An electronic circuit for preventing simultaneous write accesses to a target data storage location by a priority system resource and a secondary system resource, comprising:
   a priority access interface coupled to said priority system resource;
   a secondary access interface coupled to said secondary system resource;
   a priority control module coupled to said priority access interface and said target data storage location;
   a secondary control signal coupled to said secondary access interface that initiates a first write access to said target data storage location by said secondary access interface;
   a busy signal coupled to said priority control that asserts a busy state, said first write access to said target data storage location by said secondary access interface being blocked during said busy state;
   a lookahead signal coupled to said priority control module and generated by said priority access interface, said lookahead signal causing said busy signal to assert said busy state; and a priority control signal coupled to said priority control module and said priority access interface that initiates a second write access to said target data storage location from said priority access interface; and wherein execution of said first write access is automatically unblocked if said waiting host signal is in an active state and said busy signal is de-asserted.

20. The electronic circuit of claim 19 further comprising a waitinghost signal coupled to said priority control module and said priority access interface to indicate said first write access to said target data storage location by said secondary access interface is blocked.

21. The electronic circuit of claim 19 further comprising an abort signal coupled to said priority control module and said priority access interface that causes said busy signal to deassert said busy state.

22. A computer system comprising:

a host bus;

a host bus interface coupled to said host bus;

a peripheral bus;

a peripheral bus interface coupled to said peripheral bus;

a target data storage location coupled between said host bus interface and said peripheral bus interface; and a priority control module coupled between said host bus interface and said target data storage location that blocks execution of a host access to said target data storage location during execution of a peripheral access to said target data storage location from said peripheral bus interface and in response to a request for said peripheral access to said target data storage location from said peripheral bus, and wherein said blocked execution of said host access to said target storage location is automatically unblocked after execution of said peripheral access independent of a subsequent request for said peripheral access to said target data storage location from said secondary bus.

23. The computer system of claim 22 wherein said peripheral bus interface asserts a lookahead signal to said priority control module in response to said request for said peripheral access to said target data storage.

24. The computer system of claim 23 wherein said priority control module asserts a busy signal in response to said lookahead signal, said busy signal remaining asserted until said peripheral access to said target data storage location terminates.

25. The computer system of claim 24 wherein said busy signal blocks said host access to said target data storage location.

26. The computer system of claim 22 wherein said peripheral bus is a serial bus.

27. The computer system of claim 22 wherein said host bus is a PCI bus.

28. A method for coordinating exclusive access to a target data storage location located between a priority bus and a secondary bus comprising the steps of:

receiving a request for a priority access to said target data storage location from said priority bus, execution of said priority access having a first phase and a second phase;

providing a lookahead signal in response to said request for said priority access;

asserting a busy signal in response to said lookahead signal;

performing said first phase of said priority access;

performing said second phase of said priority access; and deasserting said busy signal following said second phase of said priority access, wherein said deassertion of said busy signal occurs independent of a request for access to said target data storage location from said secondary bus.

29. The method of claim 28 further comprising the step of asserting an abort signal that terminates said priority access and deasserts said busy signal.

30. The method of claim 28 further comprising the step of receiving a secondary access to said target data storage location from said secondary bus.

31. The method of claim 30 further comprising the step of blocking said 'secondary access to said target data storage location if said busy signal is asserted.

32. The method of claim 30 further comprising the step of asserting a waitinghost signal if said secondary access is initiated and said busy signal is asserted.

33. A method for coordinating exclusive access to a target data storage location from a priority bus and a secondary bus comprising the steps of:

entering an idle state;

waiting in said idle state for a priority control signal from said priority bus and a secondary control signal from said secondary bus, if said priority control signal, said secondary control signal, and a waitinghost signal are deasserted;

if waiting in said idle state, performing a first phase of a priority access to said target data storage location if said priority control signal is asserted;

if performing said first phase of a priority access to said target data storage location, performing a second phase of said priority access to said target data storage location on a subsequent clock cycle;

if performing said second phase of said priority access to said target data storage location, returning to said waiting step when said second phase of said priority access terminates if both said secondary control signal and said waitinghost signal are deasserted;

if performing said second phase of said priority access to said target data storage location, performing a first phase of a secondary access to said target data storage location if at least one of said secondary control signal and said waitinghost signal is asserted;

if waiting in said idle state, performing said first phase of said secondary access to said target data storage location if said priority control signal and said busy signal are deasserted and at least one of said secondary control signal and said waitinghost signal is asserted;

if performing said first phase of said secondary access to said target data storage location, performing a second phase of a secondary access to said target data storage location on a subsequent clock cycle;

if performing said second phase of said secondary access to said target data storage location, returning to said waiting step when said secondary access terminates if said priority control signal is deasserted;

if performing said second phase of said secondary access to said target data storage location, performing said first phase of said priority access when said secondary access terminates if said priority control signal is asserted.

34. The method of claim 33 further comprising the step of returning to said waiting step if an abort signal is asserted.

* * * * *